United States Patent
Kollep

(10) Patent No.: US 8,364,321 B2
(45) Date of Patent: Jan. 29, 2013

(54) BEVERAGE PRODUCTION MODULE AND METHOD FOR OPERATING A BEVERAGE PRODUCTION MODULE

(75) Inventor: Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 453 days.

(21) Appl. No.: 12/598,686

(22) PCT Filed: Apr. 22, 2008

(86) PCT No.: PCT/EP2008/054858
§ 371 (c)(1),
(2), (4) Date: Nov. 3, 2009

(87) PCT Pub. No.: WO2008/138710
PCT Pub. Date: Nov. 20, 2008

(65) Prior Publication Data
US 2010/0138053 A1   Jun. 3, 2010

(30) Foreign Application Priority Data
May 16, 2007   (EP) .................................... 07108357

(51) Int. Cl.
*G05D 7/00* (2006.01)
*B65B 1/04* (2006.01)

(52) U.S. Cl. .......... 700/283; 700/90; 700/233; 426/433; 141/83

(58) Field of Classification Search .................. 700/281, 700/90, 233, 283; 99/275, 280; 141/83, 141/1; 426/433; 222/144.5
See application file for complete search history.

(56) References Cited

U.S. PATENT DOCUMENTS

| | | | | |
|---|---|---|---|---|
| 6,759,072 | B1 * | 7/2004 | Gutwein et al. | 426/433 |
| 7,197,367 | B2 * | 3/2007 | Brinkemper et al. | 700/90 |
| 7,201,005 | B2 * | 4/2007 | Voglewede et al. | 62/126 |
| 7,210,601 | B2 * | 5/2007 | Hortin et al. | 222/144.5 |
| 7,828,020 | B2 * | 11/2010 | Girard et al. | 141/2 |
| 8,032,251 | B2 * | 10/2011 | Monn | 700/233 |
| 8,062,684 | B2 * | 11/2011 | Gutwein et al. | 426/433 |
| 8,201,736 | B2 * | 6/2012 | Doglioni Majer | 235/383 |
| 8,245,735 | B2 * | 8/2012 | Chase et al. | 141/1 |
| 8,251,258 | B2 * | 8/2012 | Rudick et al. | 222/31 |
| 2005/0016385 | A1 | 1/2005 | Brinkemper et al. | 99/280 |

(Continued)

FOREIGN PATENT DOCUMENTS

| | | |
|---|---|---|
| DE | 102 44 982 A1 | 4/2004 |
| EP | 1 448 084 | 8/2004 |

(Continued)

OTHER PUBLICATIONS

International Search Report, PCT/EP2008/054858, mailed Oct. 21, 2008.

(Continued)

*Primary Examiner* — Dave Robertson
(74) *Attorney, Agent, or Firm* — Winston & Strawn LLP

(57) ABSTRACT

A beverage production module that includes a pump for delivering a beverage via a beverage delivery outlet from the beverage production module, a graphical interface for accepting touch input, and a controller in data communication with the pump and the graphical interface for receiving filling level instructions and controlling the pump accordingly. The graphical interface may also include a pointer for providing filling level instructions by touch input on the graphical interface. Also, a method for operating a beverage production module having the foregoing features.

9 Claims, 24 Drawing Sheets

U.S. PATENT DOCUMENTS

| | | |
|---|---|---|
| 2005/0050480 A1 | 3/2005 | Katla et al. .................... 716/1 |
| 2008/0050480 A1 | 2/2008 | Doglioni Majer ............ 426/231 |
| 2008/0183330 A1 | 7/2008 | Monn ........................... 700/239 |
| 2010/0256826 A1* | 10/2010 | Crisp, III ..................... 700/283 |
| 2011/0125334 A1* | 5/2011 | Deo et al. ...................... 700/283 |
| 2011/0210140 A1* | 9/2011 | Girard et al. ....................... 222/1 |

FOREIGN PATENT DOCUMENTS

| | | |
|---|---|---|
| EP | 1 647 951 A1 | 4/2006 |
| EP | 1 676 509 | 7/2006 |
| EP | 1 992 263 B1 | 11/2008 |
| WO | WO 2007/003062 | 1/2007 |
| WO | WO 2007/014584 | 2/2007 |

OTHER PUBLICATIONS

Opposition against EP 1 992 263 B1, dated Sep. 14, 2012 (with English translation).

Presentation of the NICTA (Australian Government Dept. of Communication, Information Technology and the Arts (2007/2008).

\* cited by examiner

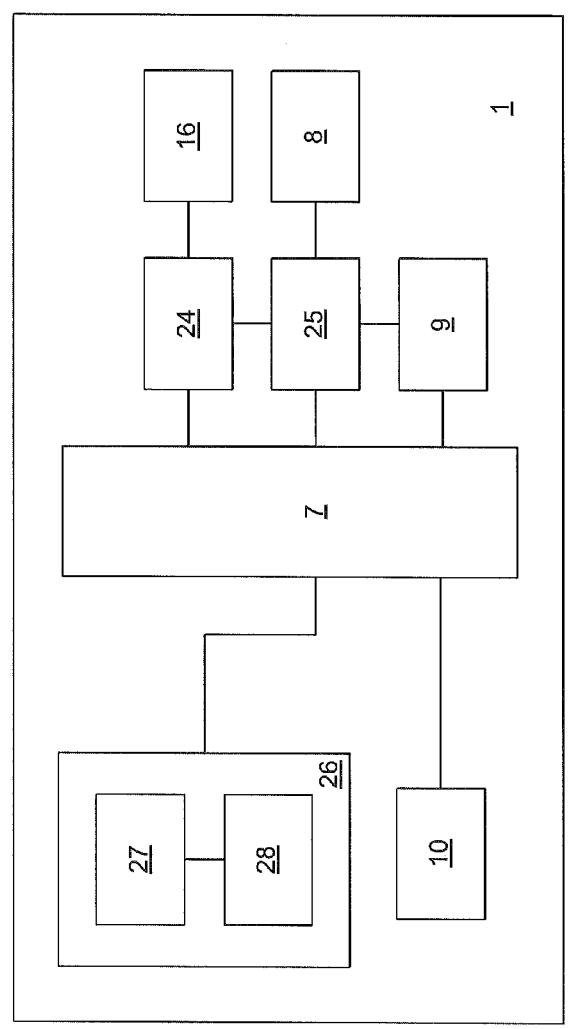

BEVERAGE PRODUCTION MODULE AND METHOD FOR OPERATING A BEVERAGE PRODUCTION MODULE

This application is the 371 filing of International patent application PCT/EP2008/054858 filed Apr. 22, 2008.

BACKGROUND

The present invention generally relates to the production of beverages or liquid comestibles (soup, etc.). Preferably, the invention relates to production devices which are designed to produce a beverage on the basis of ingredients which are contained in a capsule. The capsule is inserted in the beverage production module which is provided with means to introduce a liquid into the interior of the capsule. The interaction of the introduced liquid with the ingredients produces a beverage which can then be obtained from the beverage production module.

As an illustrative example, such devices are already used, among others, in the field of coffee machines. Especially regarding coffee machines there is a wide range between relatively simple "one button" machines on one end of the range, and highly complex machines with integrated additional functions, such as for example producing steam, pre-warming cups and/or ensuring a "flow stop" function, etc., at the higher end of the range.

The different machines of the range offer different buttons, control panels, interfaces or other input means for enabling the user to operate the machine.

WO 2007/014584 A1 discloses a control panel for an automatic machine for preparing hot beverages. The panel comprises a main input element, a display element, a control unit in data communication with the main input element and the display element. The main input element comprises a sense element adapted to detect a motion thereon of a touch of the user and the main input element and display element are in data communication through the control unit so that motion determines a scrolling through the plurality of input identifiers on the display element thereby selecting at least one formulation of the plurality of formulations or at least one operation parameter of a plurality of operation parameters.

WO 2007/003062 A1 discloses an operator's device for automatic hot beverage dispensers that are configured for preparing and dispensing several different beverages. The operator's device is embodied as touch screen. A first selecting mechanism is provided by displaying symbols on the touch screen enabling the selection of a beverage or a mixed beverage. After having selected a beverage, a second selecting means is provided by displaying further key symbols that enable the user to select different settings for the previously selected beverage.

SUMMARY OF THE INVENTION

The present invention proposes a beverage production module and a method for operating a beverage production module which is simplified in construction and more intuitive to use than those of the prior art.

It is the object of the present invention to propose a beverage production module and a method for operating a beverage production module which is simplified in construction and more intuitive to use.

A first aspect of the present invention relates to a beverage production module comprising a pump for delivering a beverage via a beverage delivery outlet from the beverage production module, a graphical interface for accepting a touch input, said graphical interface comprising a pointing means for providing filling level instructions by a touch input on the graphical interface and control means in data communication with the pump (24) and the graphical interface for receiving filling level instructions and controlling the pump accordingly.

In a preferred embodiment the graphical interface comprises a virtual representation of at least one type of receptacle and the pointing means comprises a virtual filling level icon that can be displaced by a touch input in relation to the virtual representation of the at least one receptacle.

In the preferred embodiment the virtual filling level icon can be displaced in any position of level in relation to the representation of the receptacle.

Alternatively, the pointing means comprises several virtual filling level icons at predetermined virtual positions on the graphical representation of the receptacle.

Further, preferably the pointing means comprises a bar, an arrow and/or a tip for graphically indicating filling level instructions on the graphical interface.

The module can further comprise a sensing means in data communication with the control means and designed to sense the actual volume of the beverage delivered from the pump.

In a preferred embodiment the graphical interface comprises an output identifier for indicating the actual volume of beverage delivered from the pump in real time as measured by the sensing means.

Preferably, the output identifier comprises a graphical representation of the progress of the filling of the virtual receptacle.

Advantageously, the pointing means is adapted to provide new filling level instructions by a further touch input on the graphical interface during the delivery of beverage.

Preferably, the control means is adapted to check, according to predefined parameters, whether the new filling level instructions can be accepted.

According to another aspect the present invention relates to a beverage production module comprising a pump for delivering a beverage via a beverage delivery outlet from the beverage production module, a graphical interface for accepting a touch input of a filling level instructions and control means connected to the pump (24) and the graphical interface for controlling the amount of beverage delivered by the pump in accordance with the input filling level instructions.

Preferably, the graphical interface comprises a pointing means for enabling the touch input of a desired filling level instructions.

In a preferred embodiment, the graphical interface comprises a virtual representation of at least one type of receptacle and the pointing means comprises a virtual filling level that can be displaced by a touch input in relation to the virtual representation of the at least one receptacle.

According to another aspect the present invention relates to a beverage delivery module comprising a pump for delivering a beverage via a beverage delivery outlet from the beverage production module, a graphical interface for accepting a touch input, said graphical interface comprising a pointing means indicating at least one possible filling level and enabling the touch input of a desired filling level instructions and control means for controlling the beverage delivery outlet and the graphical interface, said control means receiving the desired filling level instructions from the graphical interface and controlling the pump in accordance with the received desired filling level instructions.

According to another aspect the present invention relates to a method for operating a beverage production module comprising the steps of providing a graphical interface for accepting a touch input, providing a pointing means for providing filling level instructions by the touch input on the graphical interface, transmitting the filling level instructions to a control means being in data communication with the graphical interface and controlling by the control means the delivery of a beverage from a beverage delivery output accordingly.

According to another aspect the present invention relates to a method for operating a beverage production module (1) comprising the steps of providing a graphical interface for accepting a touch input of a filling level instructions, transmitting the filling level instructions to a control means being connected to graphical interface and controlling by the control means the amount of beverage delivered by a pump in accordance with the input filling level instructions.

According to another aspect the present invention relates to a method for operating a beverage delivery module (1) comprising the steps of providing a graphical interface for accepting a touch input, providing a pointing means indicating a possible filling level and enabling the touch input of a desired filling level instructions, transmitting the desired filling level instructions to a control means and controlling the delivery of a beverage from a pump in accordance with the received desired filling level instructions.

According to another aspect the present invention relates to a beverage production module comprising a pump for delivering a beverage via a beverage delivery outlet from the beverage production module, a sensing means for sensing the amount of beverage delivered by the pump and an output means being in data communication with the sensing means for providing real time information on the actual volume of beverage delivered by the pump.

In preferred embodiment, the output means is a graphical or optical device.

According to another aspect the present invention relates to a beverage production module comprising a pump for delivering a beverage via a beverage delivery outlet from the beverage production module, a human interface comprising a selection means being adapted to enable the input of filling level instructions and control means in data communication with pump and the human interface being adapted to receive the filling level instructions and to control the pump accordingly.

According to another aspect the present invention relates to a beverage production module comprising a pump for delivering a beverage via a beverage delivery outlet from the beverage production module, control means being in data communication with the pump and adapted to control the amount of beverage delivered by the pump and a human interface comprising a selection means being adapted to enable the input of filling level instructions during the delivery of beverage by the pump, whereby the control means is in data communication with the human interface and adapted to receive the filling level instructions and to control the pump accordingly.

BRIEF DESCRIPTION OF THE DRAWINGS

Further features, advantages and objects of the present invention will become evident by means of the figures of the enclosed drawings as well as by the following detailed explanation of illustrative—only embodiments of the present invention.

FIG. 2a shows a schematic block diagram of the main elements of a beverage production module according to the general idea underlying the present invention.

DETAILED DESCRIPTION OF THE INVENTION

Figure 1:
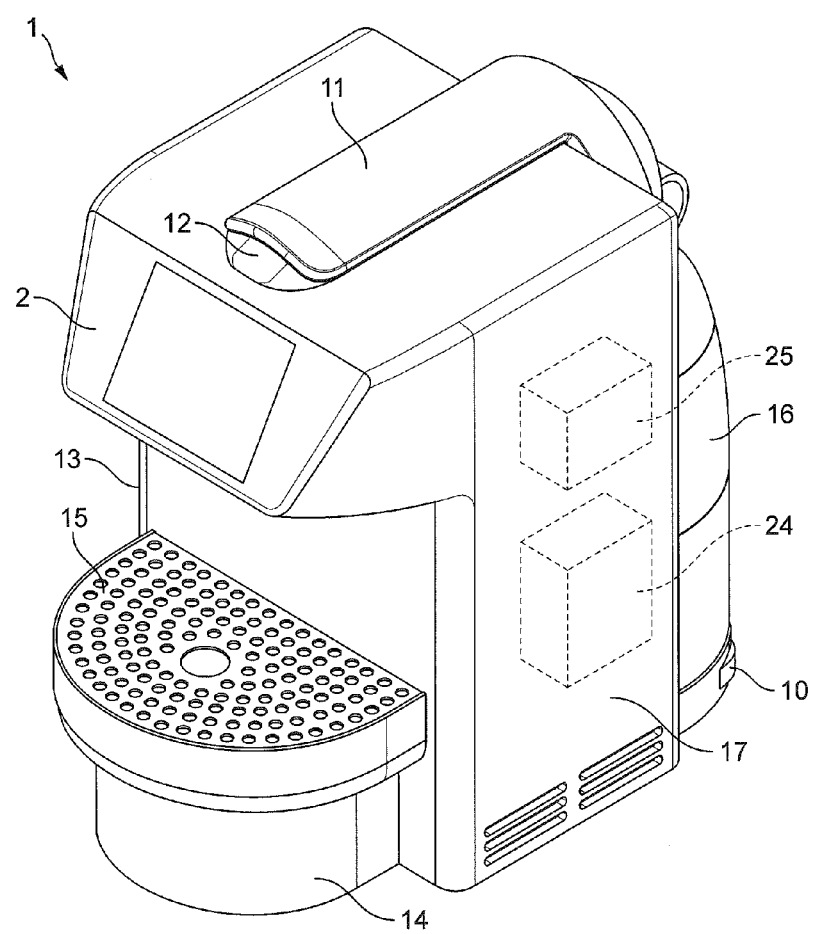
FIG. 1 shows a beverage production module according to a first embodiment of the present invention.

FIG. 1 shows a beverage production module according to a first embodiment of the present invention, generally designated with reference numeral 1, which comprises a casing 17 which houses further components or to which further components are attached.

The beverage production module 1 comprises a beverage delivery outlet 8 via which a beverage produced by the beverage production module 1 and delivered to the beverage delivery outlet 8 by a pump 24 can be obtained.

On the rear side of the casing 17 a water supply reservoir or water container 16 can be provided.

On the front side of the beverage production module 1a base part can be provided. The base part can essentially have a shape of a half cylindrical platform. The base part can comprise a drip tray 14 and the upper surface of the base part can serve as a cup support 15 in the region which is essentially arranged vertically below the beverage delivery outlet 8. The drip tray 14 can serve for collecting liquid dripping from the beverage delivery outlet 8.

The beverage production module can comprise further a catchment tank 13 for collecting capsules which have been used and which dropped internally after the beverage has been delivered.

The base part comprising the drip tray 14 and the cup support 15 can be removably attached to the casing 17. Alternatively, the entire component consisting of the drip tray 14, the cup support 15 and the catchment tank 13 can be attached removably to the casing 17 in order to rinse or empty the drip tray 14 and to empty the catchment tank 13.

Inside the casing 17 the beverage production module 1 can comprise a water pump 24, a water heating unit 25 such as for example a thermo block or a boiler as well as an extraction chamber. Thus the beverage production module 1 is capable of producing a heated, preferably pressurized liquid and then to feed it into a chamber in order to prepare a beverage in a cup or glass.

The pump 24 and the heater 25 as well as further components housed in the casing are not visible from the outside and are therefore showed with dashed lines in the Figures.

The extraction chamber can be designed to house a beverage ingredient containing pouch or capsule, which can be inserted through a capsule insertion slot 12 on the top surface of the casing 17 when lifting or opening a lever or lid arranged at the top surface of the casing 17. The lever or lid functions also as activator 11 for mechanically or automatically clamping the capsule and starting the preparation process. Heated water, preferably under pressure, will then be injected into the capsule in order to interact with the ingredients contained therein.

The beverage production module 1 can furthermore be provided with a graphical interface 2 such as for example a display, a touchpad or the like in order to allow the control of the operation of the beverage production module.

In addition the beverage production module 1 can comprise further user interfaces, such as for example switches or buttons 10 and so on to further control the operation of the module 1.

With reference to FIG. 2a the main components of a beverage production module 1 according to the present invention will be explained in relation to the block diagram. It is to be noted that the beverage production module comprises further elements and components necessary for carrying out the functionalities, such as e.g. a power source and the like, which are not shown in the figure for the sake of clarity.

The beverage production module 1 comprises a control means 7 being connected to and being in data communication with other elements of the beverage production module 1 in order to control the operations of the beverage production module, to receive process, store and transfer data and/or information.

The beverage production module further comprises a water container 16, a heater 25 and a pump 24 connected to the heater 25 and the water container 16. For preparing a beverage water is pumped from the water container 16 into the heater 25 and then pumped by the pump 24 into the extraction chamber. The beverage then leaves the casing 17 via a beverage delivery outlet 8 through which it is pumped by the pump 24.

The beverage production module 1 may further comprise a sensing means 9 connected to the pump 24 for sensing the amount of beverage delivered from the pump 24 via the beverage delivery outlet 8. The sensing means 9 may comprise a flow meter of other components for measuring the amount of beverage passing the beverage delivery outlet 8. Alternatively, the sensing means 9 may comprise components for measuring the actual filling level within a receptacle 18 placed below the beverage delivery outlet 8.

The beverage production module 1 further comprises a human interface 26 adapted to be operated by a user. The human interface 26 herefore comprises a selection means 27 and an output means 28.

The selection means 27 is adapted to allow the user to input filling level instructions, i.e. to select the amount of beverage the user wants to receive from the beverage production module. The selection means 27 represents in an optical or graphical way the possible filling levels that can be chosen. The selection means 27 may comprise electronic and/or mechanical components, e.g. a display, LEDs, a slider and so on.

The output means 28 is in data communication with the sensing means 9 or in data communication with control means 7 which in turn is in data communication with the sensing means 9. The output means 28 is adapted to output information of the actual filling level within the receptacle 18. The information is hereby provided in real time in correspondence with the amount of beverage sensed by the sensing means 9. The output means 28 as well may comprise electronic and/or mechanical components.

The beverage production module may comprise further input means 10, e.g. buttons or the like for enabling the user to operate the beverage production module 1.

The human interface 26, the sensing means 9, the input means 10, the heater 25 and the pump 24 are all connected to and in data communication with the control means 7.

Figure 2B:
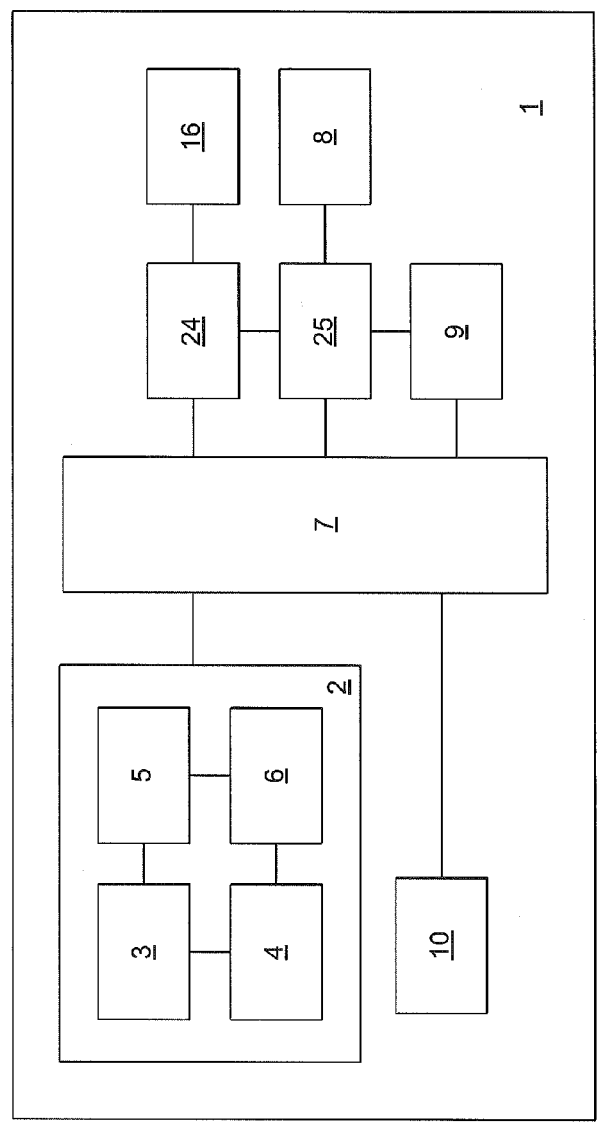
FIG. 2b shows a schematic block diagram of the main elements of a beverage production module according to a first embodiment of the present invention.

With reference to FIG. 2b a first embodiment of the present invention will now be explained. Hereby, the control means 7, the input means 10, the pump 24, the heater 25, the water container 16, the beverage delivery outlet 8 and the sensing means 9 correspond to the components explained with reference to FIG. 2a.

The beverage production module 1 further comprises a graphical interface 2 for showing data and/or information to a user and for receiving data and/or information from a user.

The graphical interface 2 particularly comprises a display 3 for displaying pictures, information or the like. The graphical interface 2 further comprises a touchpad 5 for enabling a user to input information by touching the touchpad 5. In the graphical interface 2 further a pointing means 4 and an output identifier 6 are provided.

According to the general idea underlying the present invention the graphical interface 2 provides the user with the possibility to intuitively choose the filling level. The graphical interface 2 herefore provides several means in order to display a virtual image of the receptacle, which is to be filled, and at least one virtual filling level within the virtual receptacle. By a touch input on the virtual image the user can choose or change the filling lever by touching the graphical interface and/or by sliding over the graphical interface 2.

In addition, when beverage is delivered from the beverage production outlet 8, the graphical interfaced provides the user with information on the actual filling level by displaying a virtual actual filling level within the virtual receptacle. Hereby, the chosen desired filling level and the actual filling level is graphically set into a direct relation, so that the user can simply decide, whether to change his choice of the desired filling level.

Alternatively or additionally to the filling level the user may be able to choose the amount of beverage.

Specifically the pointing means 4 indicates a possible amount of beverage that can be delivered from the beverage production module 1 or indicates a possible filling level of beverage within a receptacle 18. The pointing means 4 further enables by a touch input to select the amount of beverage to be delivered or to select the desired filling level within the receptacle 18.

The graphical interface 2 comprises an output identifier 6 which provides the user with information on the actual amount of beverage delivered from the pump 4 or on the actual filling level within the receptacle 18. The output identifier 6 hereby provides this information in accordance with the amount of beverage sensed by the sensing means 9.

The graphical interface 2, the sensing means 9, the input means 10 and the beverage delivery outlet 8 are all connected to and in data communication with the control means 7.

With reference to FIGS. 4 to 8 the first embodiment according to the present invention will be further explained.

Figure 4A:
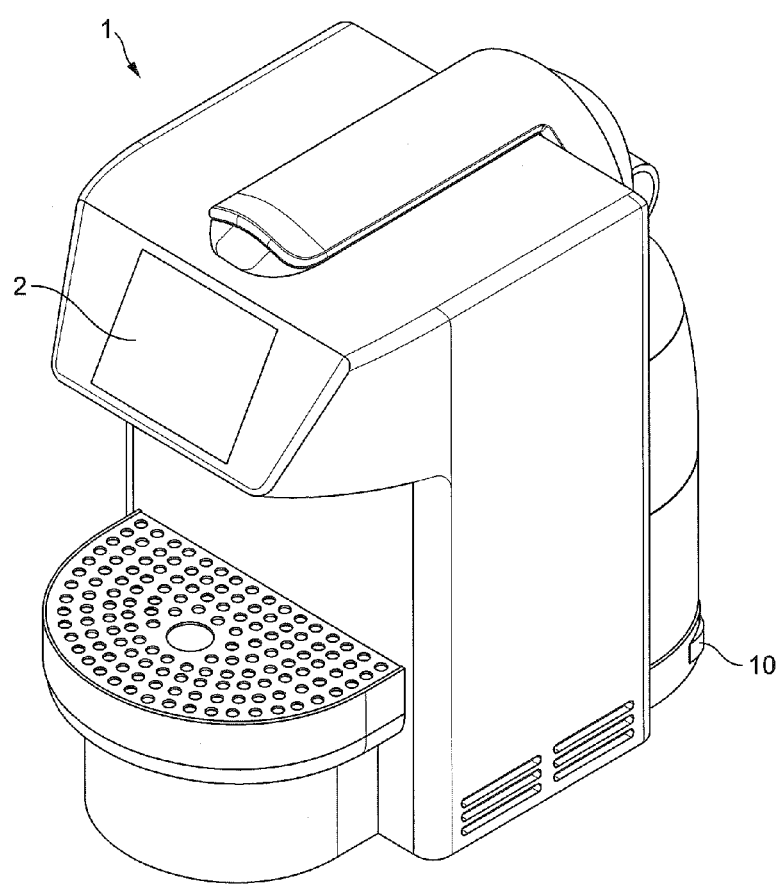
FIGS. 4a-c show a sequence of initializing a beverage production module according to the present invention.
Figure 4B:
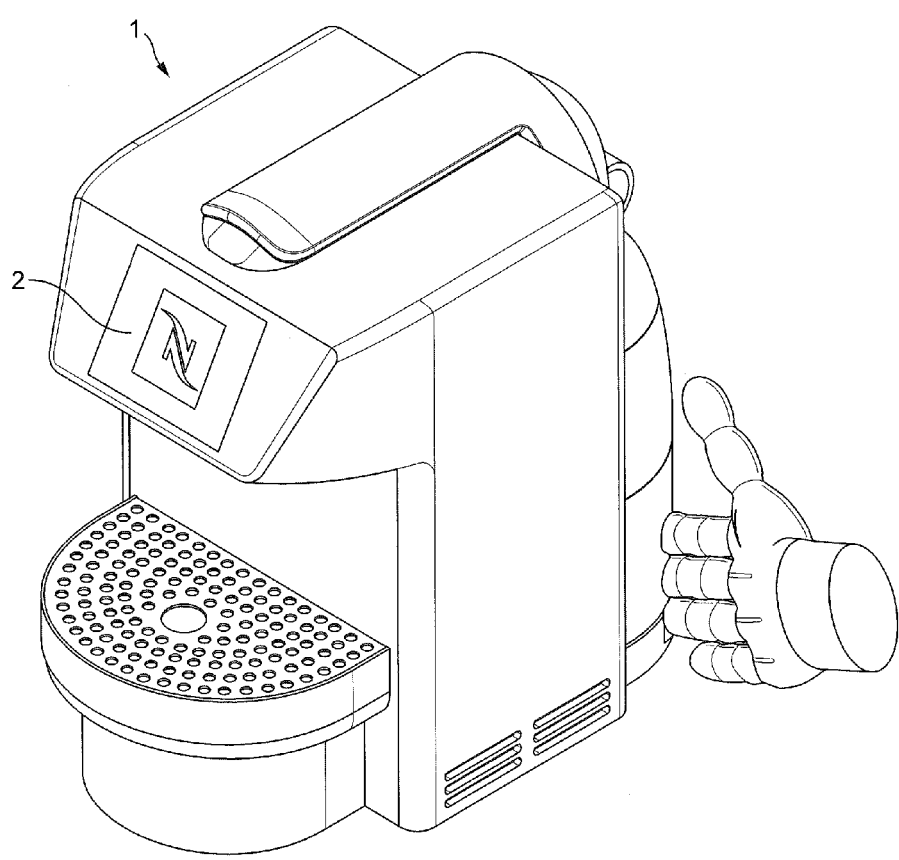
Figure 4C:
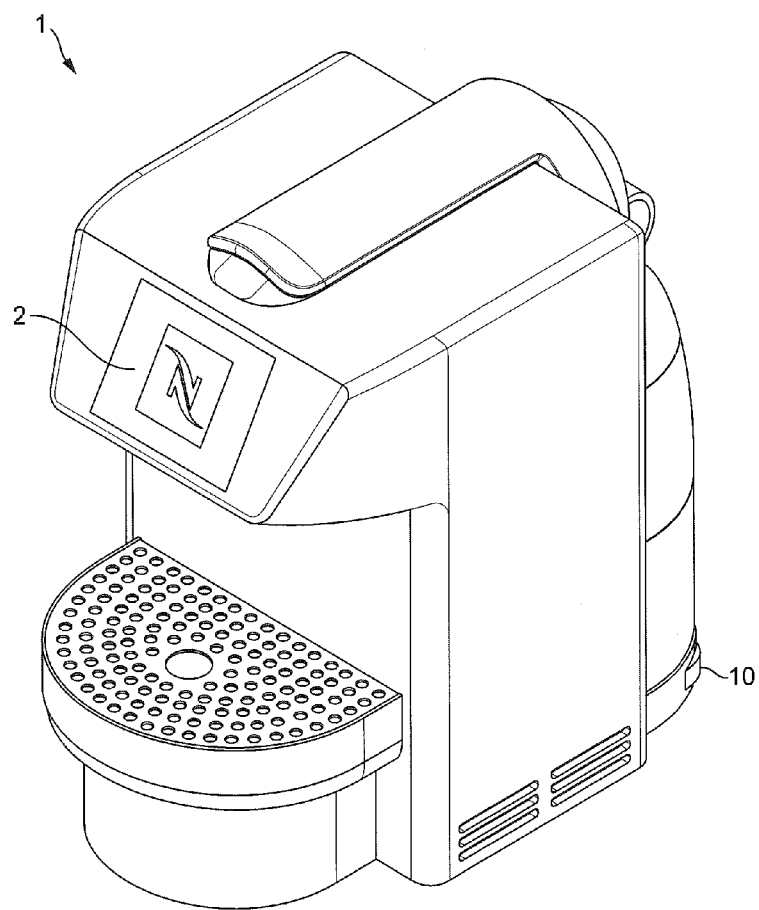

FIGS. 4a-c show the initialization phase of a beverage production module 1. Specifically, FIG. 4a shows a beverage production module comprising a graphical interface 2 and an input means 10, which in the example of FIG. 4a is a switch.

FIG. 4b shows the state in which the user approaches the beverage production module 1 and by operating the input means 10, specifically as shown in FIG. 4b by operating button can initialize the beverage production module 1. The graphical interface 2 then displays information to the user that a beverage production module is in the initialization phase. During the initialization phase the heater 25 and other components may be prepared.

In FIG. 4c the initialization phase has been completed and on a graphical interface 2 information may be displaced which shows the user that the beverage production module 1 can now be operated.

Figure 5A:
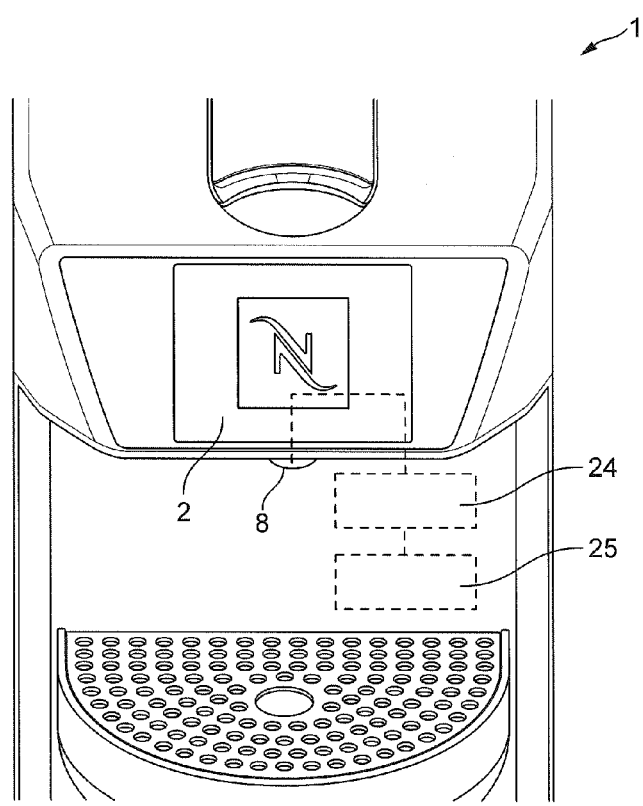
FIG. 5a-b show a sequence of different display modes of a beverage production module according to the present invention.
Figure 5B:
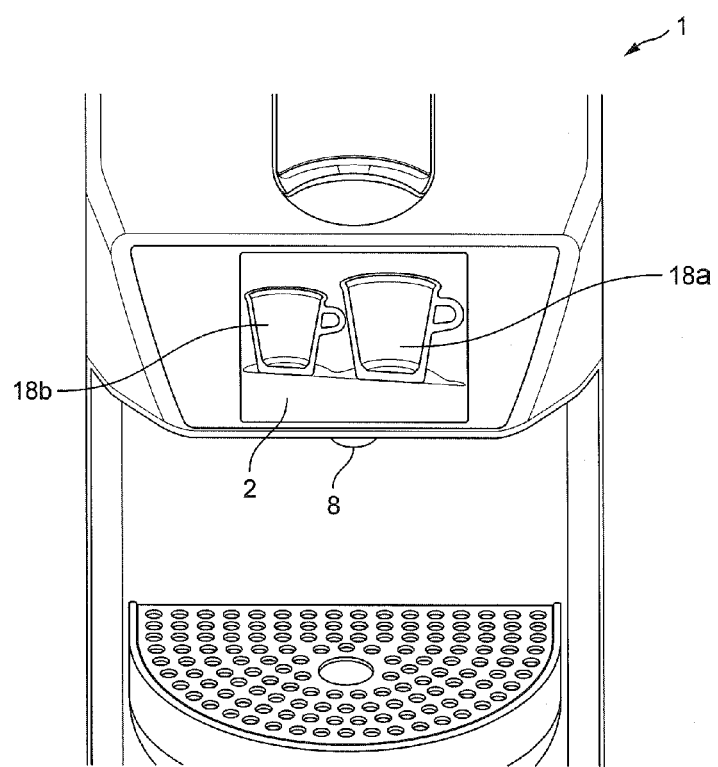

FIGS. 5a to 5b show detailed and enlarged front views of the beverage production module 1 according to the present invention. In FIG. 5a again the graphical interface 2 shows that the beverage production module 1 has been initialized. Further, the pump 24 and the heater 25 within the casing are shown with dashed lines. The pump 24 is further connected directly or indirectly to the beverage delivery outlet 8.

According to FIG. 5b in the next state the graphical interface 2 provides the user with information of the different sizes of receptacles that can be chosen. In the present example on the graphical interface by using the display 3 two receptacles 19a and 19b are shown, whereby 19b is a small receptacle and 19a is a large receptacle.

Figure 6A:
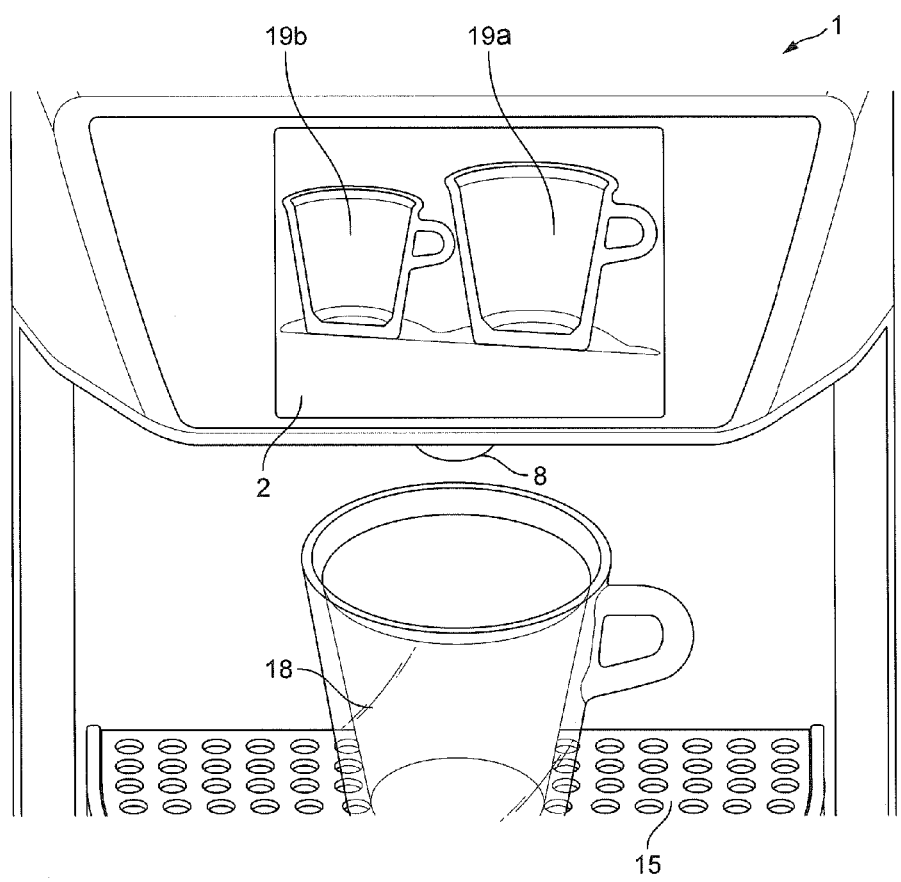
FIGS. 6a-c show the sequence of choosing different parameters related to the delivery of a beverage from the beverage production module according to the present invention.
Figure 6B:
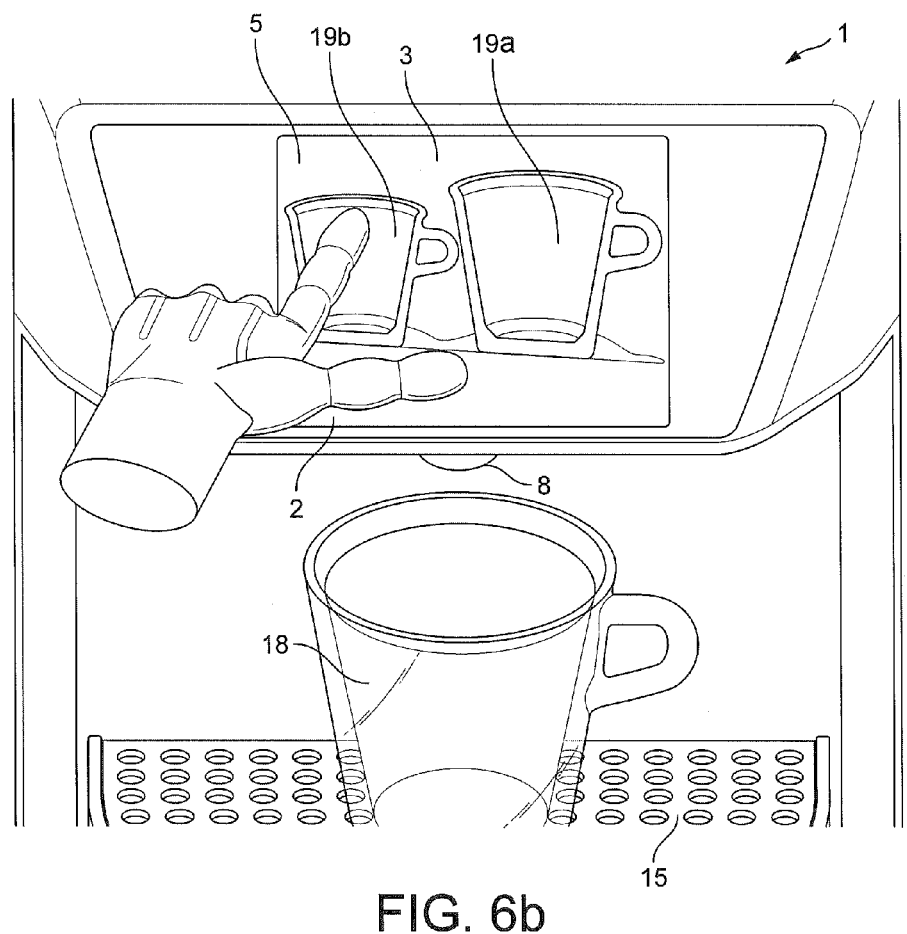
Figure 6C:
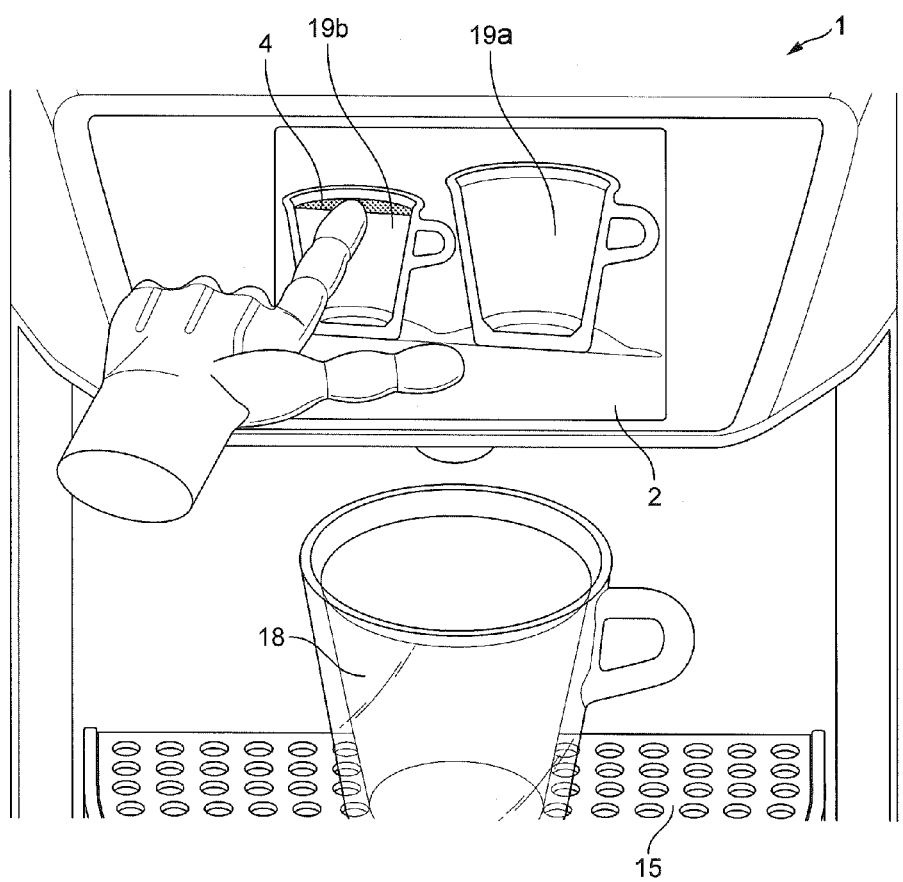

FIGS. 6a to 6c show the sequence where the user is enabled to choose the size of the receptacle and the desired amount of beverage that shall be delivered from the pump 24 via the beverage delivery outlet 8.

As shown in FIG. 6a a real receptacle 18 has been placed on the cup support 15 in vertical alignment with the beverage delivery outlet 8.

On the display 3 of the graphical interface 2 the virtual images of a small receptacle 19b and a large receptacle 19a are provided.

As already explained the graphical interface 2 comprises a touchpad 5 enabling the user to operate the beverage production module 1 by touching the touchpad 5.

In the example as shown in FIG. 6b the user can choose the small receptacle 19b by touching the picture shown on the display 3 of the graphical interface 2. The touchpad 5 will then provide respective information regarding the size of the receptacle to the control means 7.

After choosing the size of the receptacle the user is further enabled to input information regarding the desired amount of beverage delivered from the pump 24 via the beverage delivery outlet 8 or regarding the desired filling level within the receptacle 18. As shown in FIG. 6c a virtual picture of a receptacle 19b is shown on the display 3 of the graphical interface 2. By touching a point of the virtual receptacle 19b shown on the display 3 the user can choose the filling level within the receptacle 19b, that is the touched point within the virtual receptacle is processed a chosen filling level.

When touching the touchpad 5 of the graphical interface 2 a pointing means 4 provides information regarding the possible filling level and regarding the actual chosen filling level. The pointing means 4 hereby may either be a virtual filling level shown within the receptacle 19b on the display, the pointing means 4 may further comprise a bar, an arrow and/or a tip for graphically indicating filling level information on the graphical interface 2.

After choosing the size of the receptacle as well as the desired amount of beverage or the desired filling level, the pointing means 4 and/or the graphical interface 2 provides information regarding the selected amount of the selected filling level to the control unit which in turn controls the delivery of beverage from the pump 24.

With reference to FIGS. 7a to 7h a sequence of delivering the beverage and further a sequence of changing the filling level information or the amount information during the delivery will be explained.

Figure 7A:
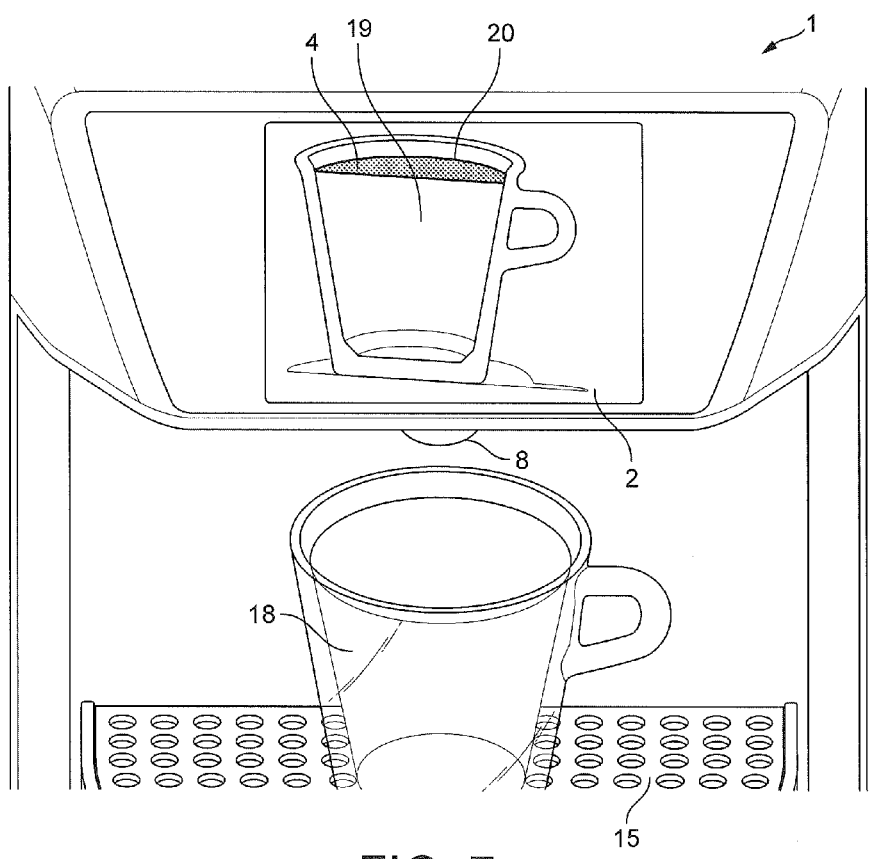
FIGS. 7a-h show a sequence of delivering a beverage from the beverage production module and at the same time enabling the user to change the parameters previously input in the sequence as shown in FIGS. 6a to 6c, FIGS. 8a-b show the sequence of ending the delivery of a beverage from the beverage production module according to the present invention

FIG. 7a shows the state of the beverage production module 1 after the user has chosen the size of the receptacle as well as the amount of beverage and before the start of delivering a beverage from the pump 24 via the beverage delivery outlet 8. In this state an enlarged view of a virtual receptacle 19 is shown on the display 3 of the graphical interface 2. The pointing means 4 of the graphical interface 2 further indicates the chosen desired filling level 20. According to FIG. 7a the desired filling level is shown as a virtual filling level within the virtual receptacle 19, but other methods of showing the desired filling level 20 are possible, e.g. a bar, an arrow, a tip or the like.

Figure 7B:
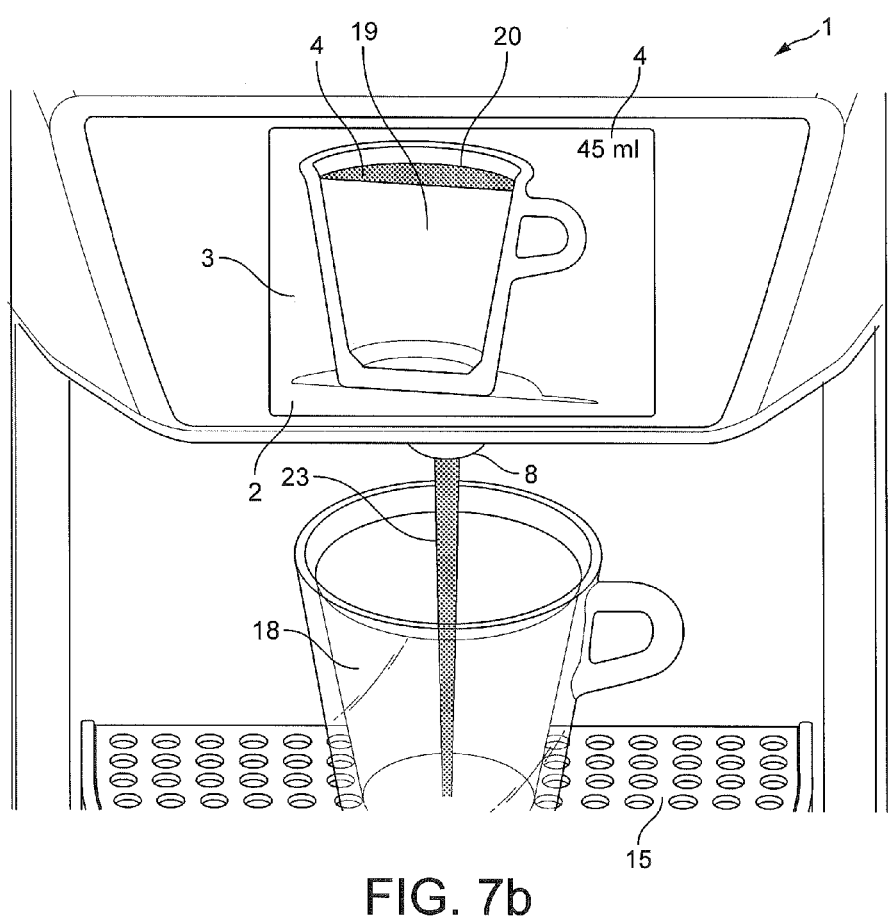

FIG. 7b shows the start of the delivery of the beverage 23 from the pump 24 via the beverage delivery outlet 8.

The beverage 23 is delivered into the receptacle 18 placed below the beverage delivery outlet 8.

The display 3 of the graphical interface 2 shows the virtual receptacle 19 and the pointing means 4 indicates the chosen desired filling level 20. In addition to the types of pointing means 4 previously described the pointing means 4 may further comprise a text which indicates the amount or the desired filling level 20, for example as shown in FIG. 7b the pointing means 4 of the graphical interface 2 indicates that a volume of beverage 23 has been chosen which corresponds to 45 ml.

The present invention enables a user to simply and intuitively input the desired amount or the desired filling level within the receptacle 18. Specifically, the pointing means 4 provides the possibility of a touch input and at the same time provides information on the filling level that can be chosen. The present invention thereby provides a beverage production module 1 with reduced components and a very intuitive way to approach the operation.

According to a further aspect of the present invention the graphical interface 2 of the beverage production module 1 allows a simple correction and/or calibration of the desired filling level 20.

Figure 7C:
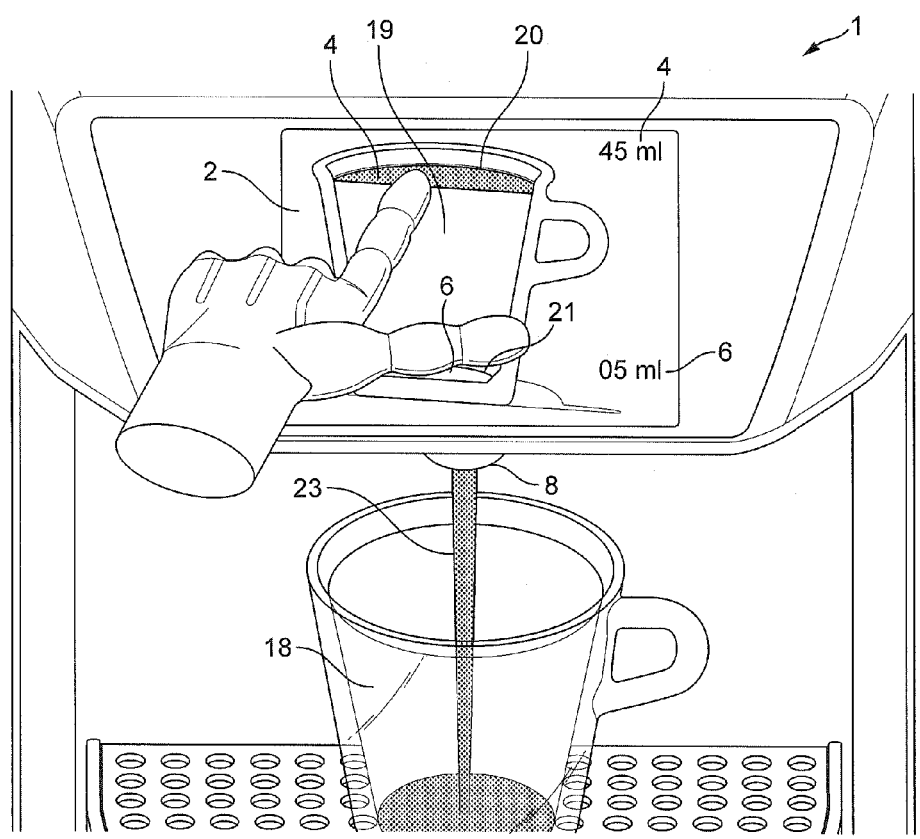

FIG. 7c shows the state where some beverage 23 has already been delivered from the pump 24 via the beverage delivery outlet 8 and filled into the receptacle 18 placed in vertical alignment below the beverage delivery outlet 8.

The output identifier 6 of the graphical interface 2 provides information on the actual filling level 21. Therefor, the sensing means 9 senses the amount of beverage 23 delivered from the pump 24 via the beverage delivery outlet 8, submits this information to the control means 7 which in turn submits the data to the graphical interface 2.

The output identifier 6 indicates the actual filling level 21. Hereby, the output identifier 6 may comprise a representation of a virtual filling level within the virtual receptacle 19 displayed by the display 3 of the graphical interface. Alternatively or additionally the output identifier 6 may comprise a bar, an arrow, a tip or a text output for informing the user on the actual filling level as sensed by the sensing means 9. In the example as shown in FIG. 7c the output identifier 6 outputs a text message, that the actual filling level corresponds to an amount of delivered beverage 23 of 5 ml.

Figure 7D:
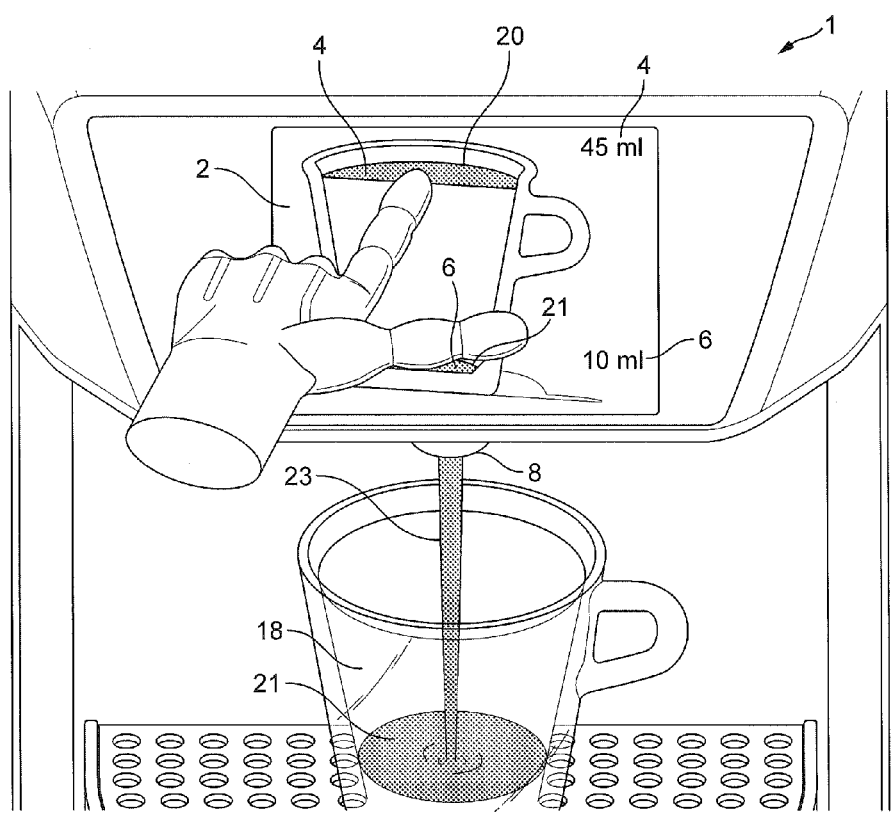
Figure 7E:
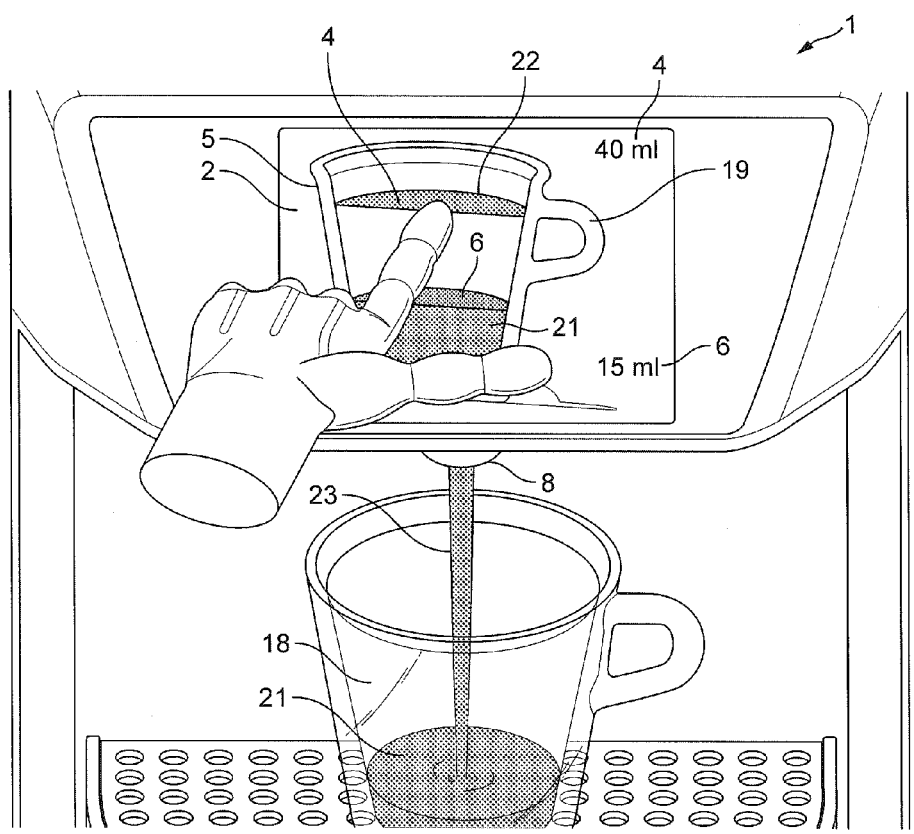

As shown in FIG. 7d during the delivery of the beverage 23 from the beverage delivery outlet into the receptacle 18 the user may approach the graphical interface for changing the desired amount of beverage or the desired filling level. By touching the pointing means 4 of the graphical interface which actually provides information about the chosen desired filling level, the user can change the amount of beverage or the desired filling level. As shown in FIGS. 7d to 7e the user can drag the pointing means 4 to a different position within the virtual receptacle 19 for choosing a new desired filling level 22. When sliding over the touchpad 5 of the graphical interface, the pointing means 4 of the graphical interface 2 provides information to which amount of beverage or to which desired filling level the actual touch position would correspond. In the example as shown in FIG. 7e the user has displaced the pointing means 4 from the previous desired filling level corresponding to an amount of 45 ml to a smaller amount of beverage and a lower desired filling level corresponding to an amount of beverage delivered of 40 ml.

At the same time beverage 23 is continuously delivered from the pump 24 via the beverage delivery outlet 8 into the receptacle 18. The actual filling level 21 is constantly measured by the sensing means 9 and the output identifier 6 of the graphical interface 2 constantly of at time intervals outputs information regarding the actual filling level 21.

Figure 7F:
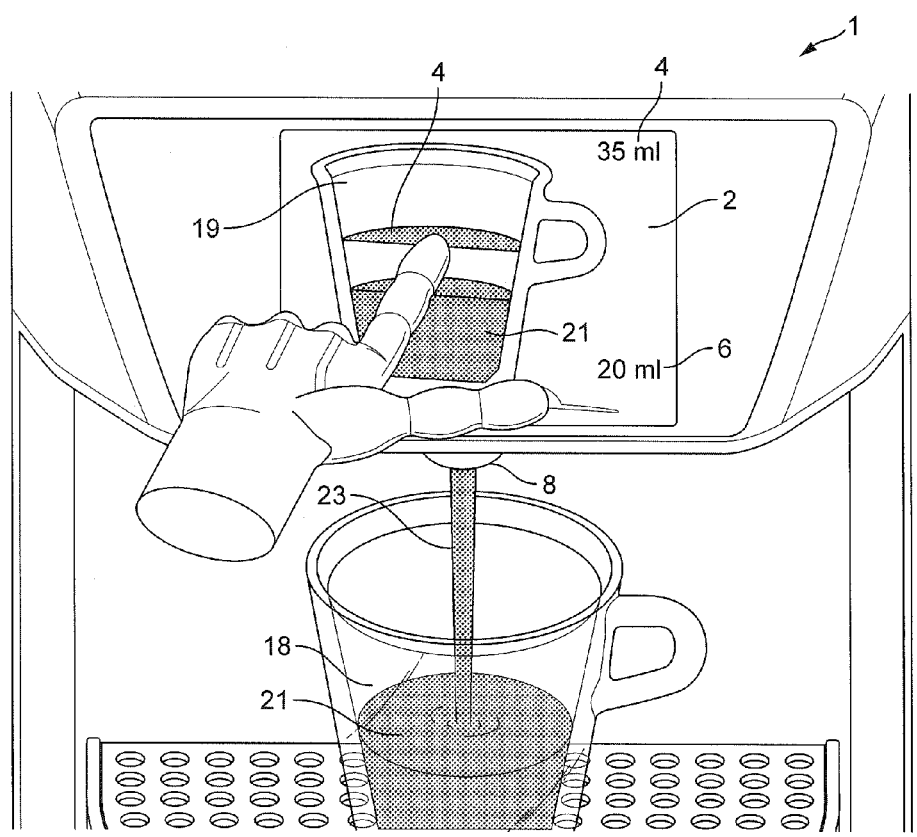

As shown in FIG. 7f the user can further drag the pointing means 4 by moving over the touchpad 5 of the graphical interface 2. As on the graphical interface 2 a pointing means 4 is provided which indicates possible filling level information and at the same time an output identifier 6 provides information on the actual filling level 21 the user can easily calibrate the desired filling level.

When observing the beverage 23 being filled into the receptacle 18 the user may come to the conclusion that the amount of beverage or the desired filling level was too large or too small. In this case he can easily change the amount or the desired filling level by simply touching the graphical interface 2 and choosing a new filling level in the same way as choosing the previously filling level. As the graphical interface 2 sets the desired filling level and the actual filling graphically into relation, the user can always observe the relation between the actual filling level and the possible desired filling level and thereby simply and intuitively choose the new desired filling level.

Figure 7G:
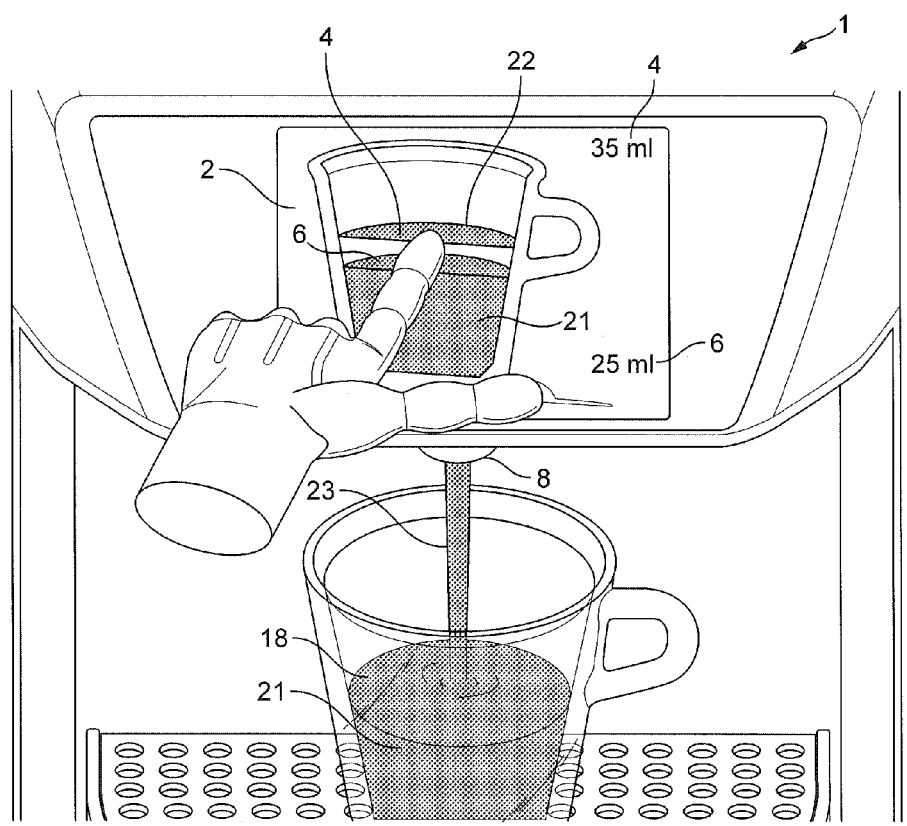

FIG. 7g shows the state where the user has definitely decided which new desired filling level 22 he wants to choose. After having dragged the pointing means 4 of the graphical interface 2 to a different position, the pointing means 4 provides the information regarding the new desired filling level 22 to the control means 7.

Figure 7H:
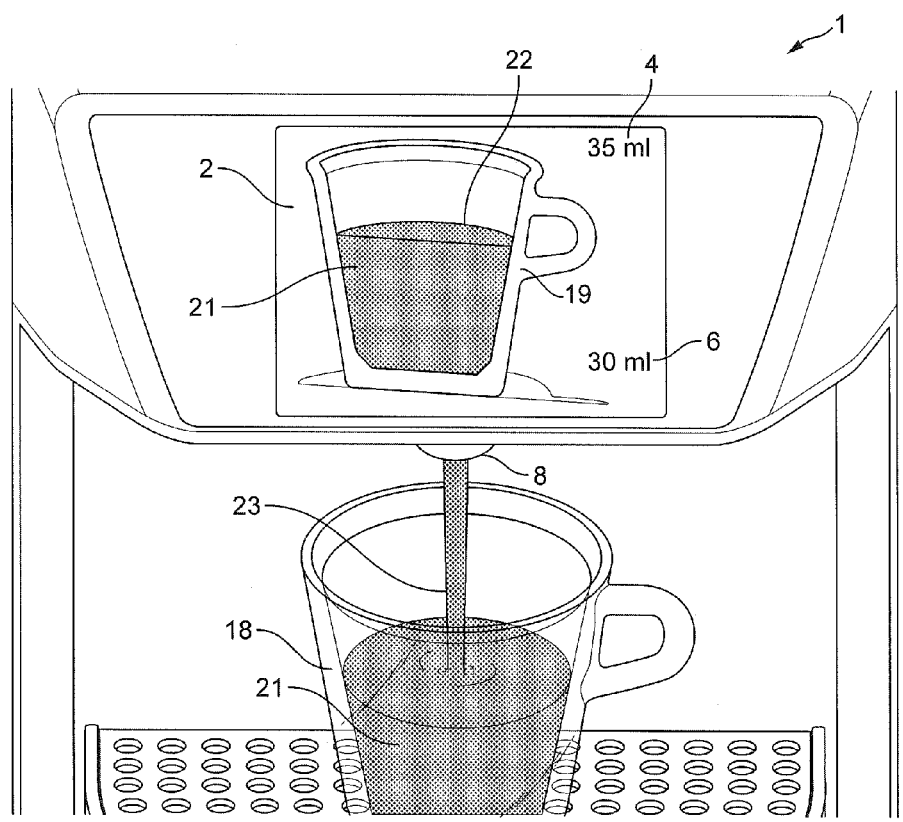

FIG. 7h shows the state where the touch input of the new desired filling level is processed by the control means 7 of the beverage production module 1. The control means 7 controls the beverage delivery outlet 8 in accordance with the new desired filling level 22 so that the amount of beverage 23 delivered from the pump 24 via the beverage delivery outlet 8 corresponds to the new amount or the new desired filling level 22.

Figure 8A:
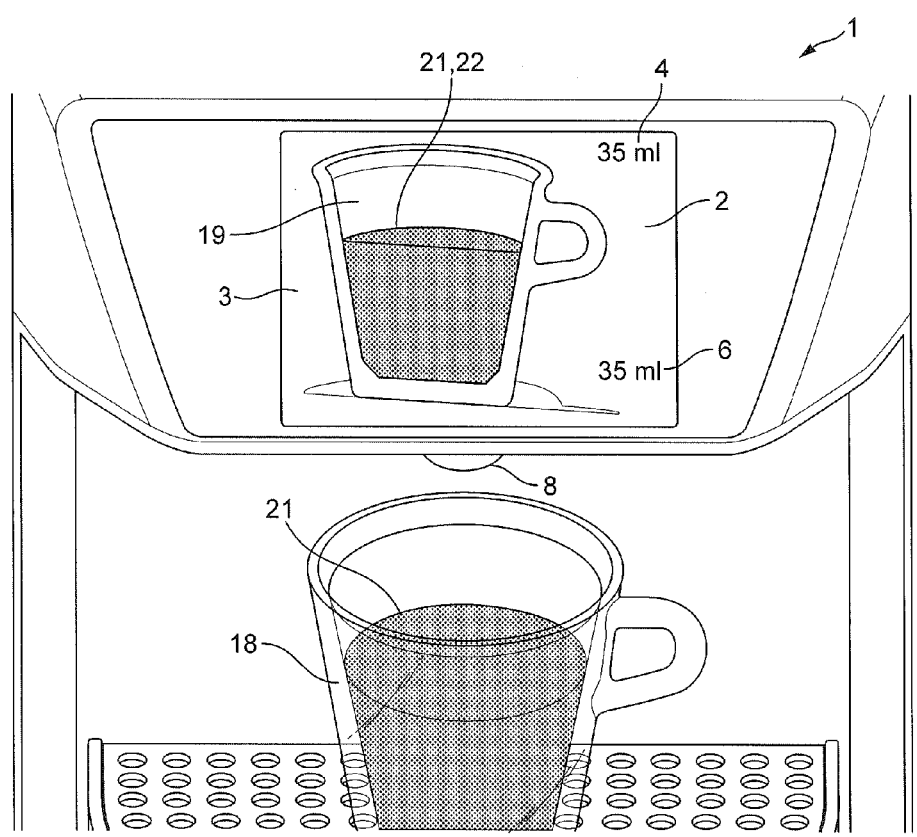
Figure 8B:
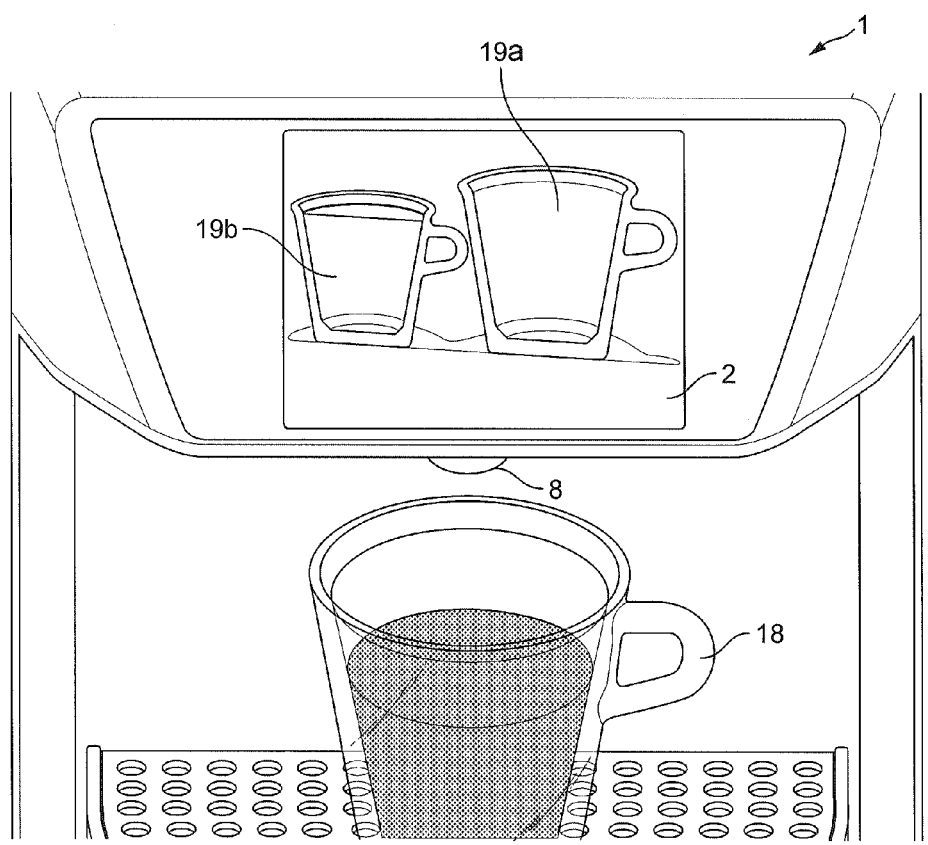
Figure 8C:
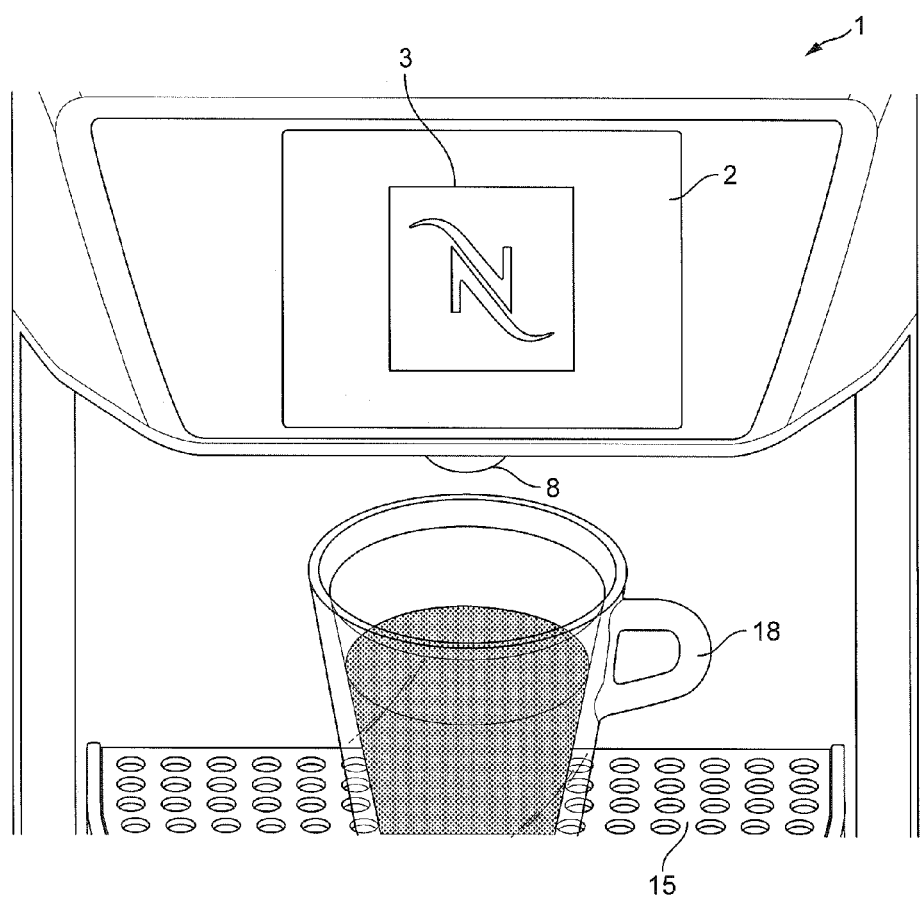

FIGS. 8a to 8c show the final state of the beverage production module 1 after having delivered a beverage 23 into a receptacle 18.

FIG. 8a shows the state where the delivery of beverage 23 by the pump has been terminated. As soon as the actual filling level 21 reaches the desired filling level 20 or the new desired filling level 22 the control means 7 of the beverage production module 1 controls the pump 24 in order to stop the delivery of the beverage into the receptacle 18.

In this state the information of the pointing means 4 regarding the desired filling level and the information provided by the output identifier 6 regarding the actual filling level 21 correspond to each other.

FIG. 8b shows the state after having finished the delivery in which the graphical interface 2 provides the user again with the possibility to start with a new beverage thereby providing the user with the graphical representation of a virtual small reptacle 19b and a virtual large receptacle 19a in order to enable the user to choose the size of the receptacle. The user is hereby enabled to operate the beverage production module 1 in order to prepare a further beverage.

If the user does not start the delivery of a beverage again, the beverage delivery module as shown in FIG. 8c can go into a state of standby and showing a corresponding message and/or symbol on the display 3 of the graphical interface 2.

Figure 9:
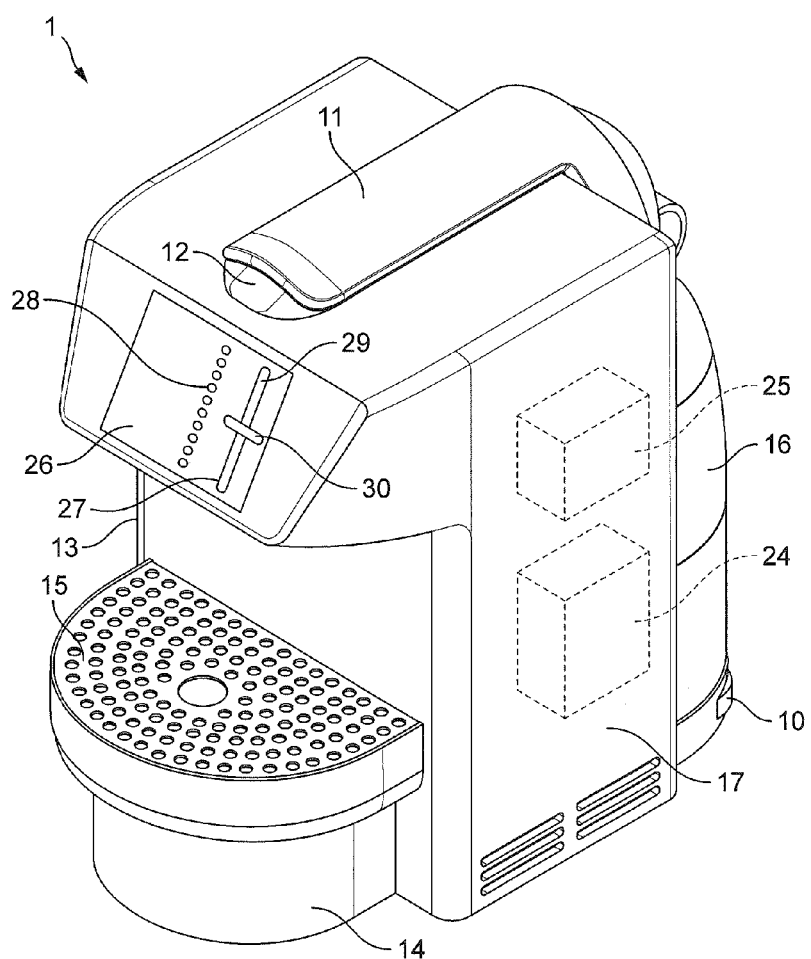
FIG. 9 shows a beverage production module according to a second embodiment of the present invention.

FIG. 9 shows a second embodiment of a beverage production module according to the present invention. Hereby, a human interface 26 is provided comprising an output means 28 which in the example of FIG. 9 are light emitting diodes (LEDs). The human interface 26 further comprises a selection means 27, which in the example of FIG. 9 consists of a slider 30 attached to a slot 29 and movably along the slot 29.

The length of the slot 29 hereby represents the range of filling levels within the receptacle 18. By moving the slider 30 along the slot 29, the user can select the desired filling level and thereby input filling level instructions which are submitted to the control means 7 and used to control the pump 24 accordingly.

In addition, the actual filling level as sensed by the sensing means 9 may be shown by the output means 28. The LEDs are hereby placed in vertical alignment and the length of the row of LEDs represents the height of the receptacle 18. The number of illuminated LEDs can thereby represent the actual filling level.

It is to be noted that the present invention is not limited to the explained embodiments but may comprises any type of selection means 27 and output means 28 enabling an intuitive an easy operation of the beverage production module 1.

Figure 3:
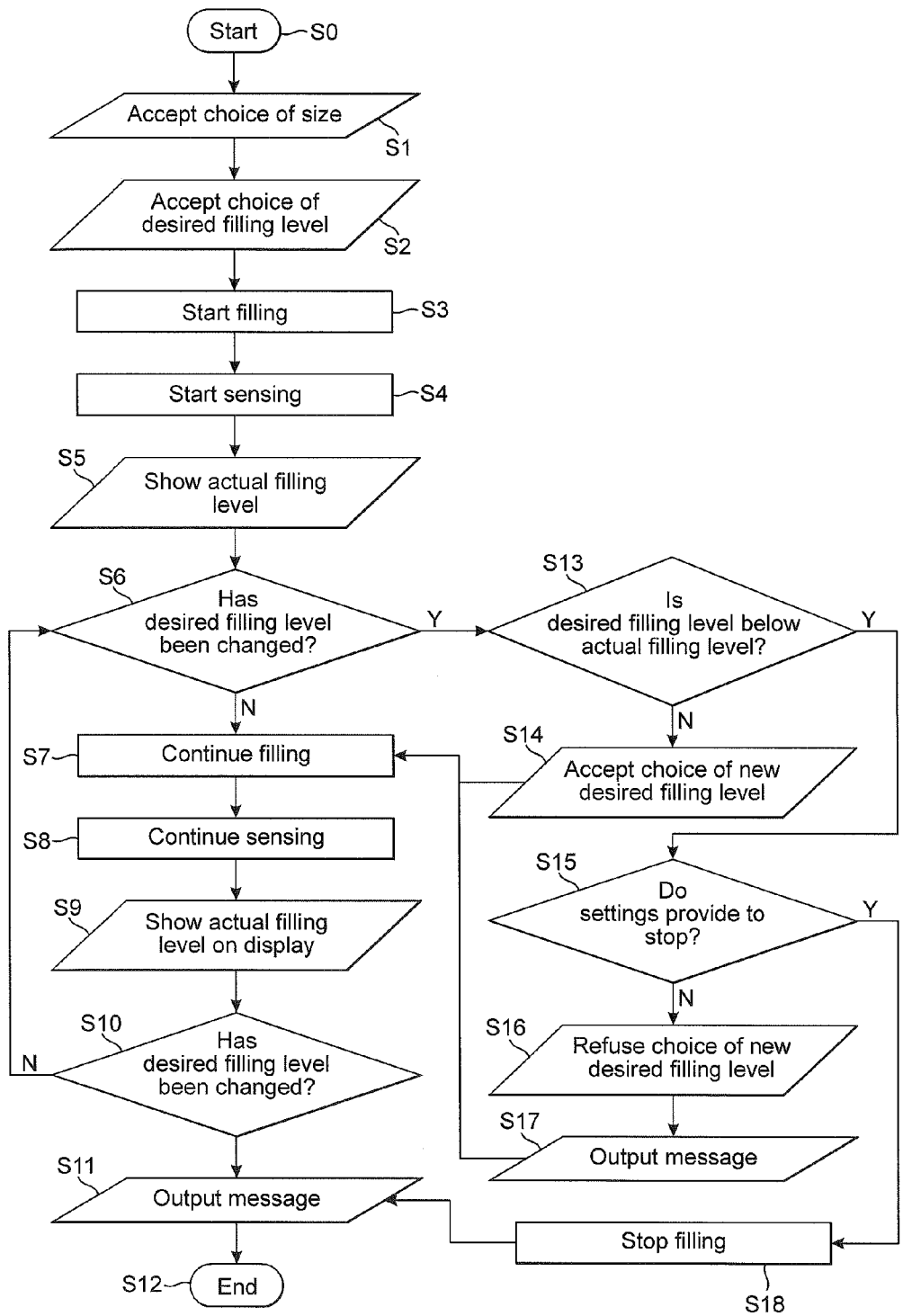
FIG. 3 shows a flow chart illustrating the process steps according to the method for operating a beverage production module according to the present invention.

In the following the method of operating a beverage production module 1 according to the present invention will be explained in more detail in relation to FIG. 3 which shows a flow chart according to the steps of the method of the present invention.

The process starts with step S0 for example with switching on the beverage production module 1. In the next step S1 the user is enabled to choose the size of the receptacle by either touching the touchpad 5 of the graphical interface 2 or by operating the input means 10 and by choosing the small receptacle 19b or the large receptacle 19a. The touchpad 5 of the graphical interface 2 or the input means 10 delivers the input to the control means 7 of the beverage production module which hereby accepts the choice of a size of a receptacle.

In the next step S2 as previously described the user can choose a desired filling level 20. The beverage production module will accept and process the choice of the desired filling level 20 accordingly.

In step S3 the beverage production module 1 starts filling the receptacle 18 by delivering a beverage 23 from the pump 24 via the beverage delivery outlet 8. In step S4 the sensing means 9 senses the amount of beverage 23 delivered from the pump 24 via the beverage delivery outlet 8. It is to be noted that the steps S3 and S4 can be accomplished at the same time or at different times. Alternatively, the sensing may start even before starting the filling.

In accordance with the amount of beverage 23 delivered from the pump 24 via the beverage delivery outlet 8 and of the information provided by the sensing means 9 in step S4 the output identifier 6 or the output means 28 shows the actual filling level 21 on the display 3 of the graphical interface 2 or on the human interface 26 in step S5.

In the next step S6 it is checked whether the desired filling level has been changed. Hereby it is possible that the control means 7 of the beverage production module regularly checks whether a new filling level instruction has been provided or alternatively as soon as a user provides new filling level instruction respective information is transmitted to the control means 7. If in step S6 it is decided that the desired filling level 20 has not been changed, the beverage production module continuous in step S7 to deliver a beverage 23 from the pump 24 via the beverage delivery outlet 8 and to fill the beverage 23 into the receptacle 18. As already explained the sensing means 9 in step S8 continuous to sense the amount of beverage 23 delivered from the pump 24 via the beverage delivery outlet 8 and the output identifier 6 or the output means 28 in step S9 shows the actual filling level 21. In the next step S10 it is checked by the control means whether the desired filling level 20 has been reached. If in steps S10 it is decided that the desired filling level 20 has been reached, i.e. the actual filling level 21 corresponds to the desired filling level 20, a message in step S11 can be output to the user indicating that the desired filling level 20 has been reached. Otherwise, if in step S10 it is decided that the desired filling level 20 has not yet been reached, the process goes back to step S6 where it is checked the desired if filling level 20 has been changed.

If in step S6 it is decided that the desired filling level 20 has been changed, then in the next step S13 it is checked if the new desired filling level 22 is below the actual filling level 21. If this is not the case, then in the next step S14 the choice of the new desired filling level 22 is accepted by the beverage production module 1 and the process continuous with step S7 with the filling of the receptacle 18.

Otherwise, if in step S13 it is decided that the new desired filling level 22 is below the actual filling level 21, then in a further step S15 the control means 7 checks which parameters are set for this case, e.g. the control means 7 checks whether an immediate stop is provided. If the control means 7 of the beverage production module decides that an immediate stop is provided, then in a further step S18 the filling of the receptacle 18 is stopped, i.e. the delivery of beverage 23 from the pump 24 via the beverage delivery outlet 8 is immediately stopped.

The process may then continue with step S11 where a message is output indicating that a delivery of beverage 23 has been terminated.

Otherwise if in step S15 the control means 7 decides that a stop is not provided, in a next step S16 the control means 7 will refuse the choice of the new desired filling level. In a further step S17 a corresponding message can be output or an acoustic signal may be provided alternatively or additionally. When refusing the choice of the new desired filling level, the control means 7 will still operate with the previously chosen desired filling level 20 in the process and therefore continues with step S7 with the filling of the receptacle.

In any case the process comes to the point where the delivery of beverage 23 from the pump 24 via the beverage delivery outlet 8 is terminated either when the actual filling level 21 has reached the desired filling level 20 or in case that the filling is immediately stopped. Then a message can be output in step S11 and the process ends in step S12 for example with switching off the beverage production module 1.

To summarize, the present invention on one hand provides a simple and intuitive way to operate a beverage production module, particularly to choose the desired amount of beverage or to choose a desired filling level within a receptacle. In addition the present invention provides a simple and intuitive way to change the desired filling level and in addition to calibrate the chosen desired filling level by providing information on the desired filling level and the actual filling level, both information being set into a graphical or optical relation thereby enabling the user to easily check on the chosen desired filling level.

REFERENCE SIGNS (1) Beverage production module
(2) Graphical interface
(3) Display
(4) Pointing means
(5) Touchpad
(6) Output identifier
(7) Control means
(8) Beverage delivery outlet
(9) Sensing means
(10) Input means
(11) Actuator
(12) Capsule insertion slot
(13) Catchment tank
(14) Drip tray
(15) Cup support
(16) Water container
(17) Casing
(18) Receptacle
(19) Virtual receptacle
(19*a*) Large receptacle
(19*b*) Small receptacle
(20) Desired filling level
(21) Actual filling level
(22) New desired filling level
(23) Beverage
(24) Pump
(25) Heater
(26) Human interface
(27) Selection means
(28) Output means
(29) Slot
(30) Slider

What is claimed is:

1. A beverage production module comprising:
a pump for delivering a beverage via a beverage delivery outlet from the beverage production module,
a graphical interface for accepting touch input, the graphical interface comprising a pointing means for providing filling level instructions by touch input on the graphical interface, and
control means in data communication with the pump and graphical interface for receiving filling level instructions and controlling the pump accordingly,
wherein the graphical interface comprises a virtual representation of at least one type of receptacle and the pointing means comprises a virtual filling level icon that can be displaced by a touch input in relation to the virtual representation of the at least one receptacle.

2. The module according to claim 1, wherein the virtual filling level icon can be displaced in any position of level in relation to the representation of the receptacle.

3. The module according to claim 1, wherein the pointing means comprises several virtual filling level icons at predetermined virtual positions on the graphical representation of the receptacle.

4. The module according to claim 1, wherein the pointing means comprises a bar, and an arrow or a tip for graphically indicating filling level instructions on the graphical interface.

5. The module according to claim 1, wherein the module further comprises sensing means in data communication with the control means and designed to sense the actual volume of the beverage delivered from the pump.

6. The module according to claim 5, wherein the graphical interface comprises an output identifier for indicating the actual volume of beverage delivered from the pump in real time as measured by the sensing means.

7. The module according to claim 6, wherein the output identifier comprises a graphical representation of the progress of the filling of the virtual receptacle.

8. The module according to claim 1, wherein the pointing means is adapted to provide a new filling level instructions by a further touch input on the graphical interface during the delivery of beverage.

9. The module according to claim 8, wherein the control means is adapted to check, according to predefined parameters, whether the new filling level instructions can be accepted.

* * * * *